United States Patent
Weis

(10) Patent No.: US 9,765,732 B2
(45) Date of Patent: Sep. 19, 2017

(54) MIXING VALVE OF AN INTERNAL COMBUSTION ENGINE

(71) Applicant: CONTINENTAL AUTOMOTIVE GMBH, Hannover (DE)

(72) Inventor: Christian Weis, Budenheim (DE)

(73) Assignee: Continental Automotive GmbH, Hannover (DE)

(*) Notice: Subject to any disclaimer, the term of this patent is extended or adjusted under 35 U.S.C. 154(b) by 0 days.

(21) Appl. No.: 14/380,783

(22) PCT Filed: Feb. 26, 2013

(86) PCT No.: PCT/EP2013/053772
§ 371 (c)(1),
(2) Date: Aug. 25, 2014

(87) PCT Pub. No.: WO2013/127763
PCT Pub. Date: Sep. 6, 2013

(65) Prior Publication Data
US 2015/0027423 A1  Jan. 29, 2015

(30) Foreign Application Priority Data
Feb. 29, 2012  (DE) .................. 10 2012 203 156

(51) Int. Cl.
F02M 29/00  (2006.01)
F02M 25/07  (2006.01)
F02M 35/10  (2006.01)
F16K 11/052  (2006.01)
F16K 11/22  (2006.01)
F02M 26/64  (2016.01)
(Continued)

(52) U.S. Cl.
CPC ........ F02M 25/0786 (2013.01); F02M 26/64 (2016.02); F02M 35/10255 (2013.01); F16K 11/0525 (2013.01); F16K 11/22 (2013.01); F01L 7/021 (2013.01); F02B 1/04 (2013.01); F02M 1/00 (2013.01); F02M 27/08 (2013.01); F02M 29/02 (2013.01); F02M 29/04 (2013.01); F02M 29/06 (2013.01)

(58) Field of Classification Search
CPC ........ F02M 29/04; F02M 29/06; F02M 27/08; F02M 1/00; F02B 1/04
USPC ......................................................... 123/590
See application file for complete search history.

(56) References Cited

U.S. PATENT DOCUMENTS

| 4,224,912 A | 9/1980 | Tanaka |
| 6,216,737 B1 | 4/2001 | Taylor et al. |

(Continued)

FOREIGN PATENT DOCUMENTS

| CN | 101449041 | 6/2009 |
| CN | 101960132 | 1/2011 |

(Continued)

*Primary Examiner* — Jacob Amick
*Assistant Examiner* — Charles Brauch
(74) *Attorney, Agent, or Firm* — Cozen O'Connor

(57) ABSTRACT

A mixing valve of an exhaust-gas recirculation device of an internal combustion engine of a motor vehicle includes an intake flap and an exhaust-gas flap coupled rigidly to one another via a coupling rod. During driving of the exhaust-gas flap, the intake flap is first pivoted in the opposite direction via the coupling rod. The exhaust-gas flap and intake flap are pivoted in the same direction only above a provided pivoting angle.

6 Claims, 2 Drawing Sheets

(51) Int. Cl.
    *F02M 1/00*     (2006.01)
    *F02M 29/04*     (2006.01)
    *F02M 29/02*     (2006.01)
    *F02M 29/06*     (2006.01)
    *F02B 1/04*     (2006.01)
    *F01L 7/02*     (2006.01)
    *F02M 27/08*     (2006.01)

(56) References Cited

U.S. PATENT DOCUMENTS

| | | | |
|---|---|---|---|
| 6,386,511 B1 | 5/2002 | Watanabe et al. | |
| 8,074,628 B2 | 12/2011 | Albert et al. | |
| 8,870,158 B2 | 10/2014 | Geiser | |
| 2005/0028796 A1* | 2/2005 | Tussing et al. | 123/568.22 |
| 2007/0181084 A1* | 8/2007 | Holmdahl | F02B 25/22 123/26 |
| 2011/0023846 A1 | 2/2011 | Miyazaki et al. | |
| 2011/0061380 A1 | 3/2011 | Leroux et al. | |

FOREIGN PATENT DOCUMENTS

| | | | |
|---|---|---|---|
| EP | 1923551 A2 * | 5/2008 | |
| EP | 2317111 | 5/2011 | |
| FR | 2926125 A1 | 7/2009 | |
| GB | 454092 A * | 9/1936 | F02M 7/18 |
| JP | 52-142852 | 11/1977 | |
| JP | 54-69217 U | 5/1979 | |
| JP | 2001-082613 | 3/2001 | |
| JP | 2011-032929 | 2/2011 | |
| JP | 2011-106672 | 6/2011 | |

\* cited by examiner

MIXING VALVE OF AN INTERNAL COMBUSTION ENGINE

CROSS-REFERENCE TO RELATED APPLICATIONS

This is a U.S. national stage of application No. PCT/EP2013/053772, filed on 26 Feb. 2013, which claims priority to the German Application No. DE 102012203156.1 filed 29 Feb. 2012, the content of both incorporated herein by reference.

BACKGROUND OF THE INVENTION

1. Field of the Invention

The invention relates to a mixing valve of an internal combustion engine of a motor vehicle, having an intake flap arranged in an intake duct and having an exhaust flap arranged in an exhaust duct, wherein the intake duct and the exhaust duct issue into a common collecting duct, and having a drive device for driving the intake flap and the exhaust flap, and wherein, in a first position, the exhaust duct is closed and the intake duct is open, having a coupling device which is coupled to a control lever of the exhaust flap and to a control lever of the intake flap.

2. Related Art

Mixing valves of this type are commonly used in exhaust-gas recirculation systems of internal combustion engines of modern motor vehicles and are known from practice. The movements of the intake flap and of the exhaust flap are controlled such that, proceeding from the first position, the exhaust flap opens linearly with an actuation signal of the drive device. The intake flap, however, initially pauses in the first position and is closed only when an actuation signal exceeds a specified value. Owing to the coupling of the two control levers, a single drive is adequate. The coupling device has a driver with an idle travel, with the control lever of the intake flap being driven along by the driver only when the control lever of the exhaust flap has exceeded a specified deflection. The driver furthermore has a spring element for preloading the intake flap. In this way, however, the known mixing valve involves high outlay from a structural aspect.

SUMMARY OF THE INVENTION

The present invention is based on the problem of further developing a mixing valve of the type mentioned in the introduction such that it requires few components and exhibits high stability.

This problem is solved according to an aspect of the invention in that the coupling device has a coupling rod for direct transmission of the movements of the control levers, and in that, in the first position, the control lever of the exhaust flap and the coupling rod are arranged at an obtuse angle relative to one another, and the control lever of the intake flap and the coupling rod are arranged at an acute angle relative to one another.

Owing to this configuration, it is achieved that, proceeding from the first position, a deflection of the coupling rod leads to a significantly greater movement of the control lever of the exhaust flap than of the control lever of the intake flap. Therefore, during the initial movement, the exhaust duct is opened to a greater degree than the intake duct is closed. Proceeding from the described position, at the start of the movement of the coupling rod, the exhaust duct is opened without the cross section of the intake duct being changed significantly. The closing movement of the intake duct thus takes place with an initial delay in relation to the opening movement of the exhaust duct. Owing to the direct transmission of the movements between the exhaust flap and the intake flap, it is made clear that no idle travel, damping or spring element is required in the components of the mixing valve according to the invention. In this way, the mixing valve exhibits particularly high stability and is composed of a particularly small number of components.

According to another advantageous refinement of the invention, to further delay the closing of the intake duct during the opening of the exhaust duct, it is expedient if, proceeding from the first position, the control levers and the coupling rod are arranged such that the movements of the exhaust flap and of the intake flap take place in opposite directions and, after a partial movement, take place in the same direction. In this way, the movements of the exhaust flap and of the intake flap are divided into two sub-ranges, specifically a first sub-range in which the movements take place in opposite directions and a second sub-range in which the movements take place in the same direction.

In another advantageous refinement of the invention, the reversal of the movement of the intake flap can be realized in a simple manner if, in the first position, the control lever of the exhaust flap is situated ahead of a dead center at which the control lever forms a straight line with the coupling rod.

In another advantageous refinement of the invention, the pivoting range of the intake flap can be set in a simple manner if the control lever of the intake flap is of a different length than the control lever of the exhaust flap. By this configuration, it is possible for the exhaust flap to be pivoted from the fully closed position into a fully open position, whereas the intake flap is pivoted from the fully open position only into a partially closed position. These movements are attained if the control lever of the intake flap is shorter than the control lever of the exhaust flap.

In another advantageous refinement of the invention, blocking of the movements of the coupling rod at dead centers with the control levers can be avoided in a simple manner if the drive device has an actuating motor for driving the exhaust flap. By this configuration, the direction of the transmission of the movement is defined as being from the exhaust flap to the intake flap via the control levers and the coupling rod.

In another advantageous refinement of the invention, the mixing valve is of particularly simple construction if the exhaust duct is arranged at right angles to the intake duct, if, in the first position, the exhaust flap is arranged approximately parallel to the intake flap, and if the control levers face toward one another.

BRIEF DESCRIPTION OF THE DRAWINGS

The invention permits numerous embodiments. To further illustrate its basic principle, one of the embodiments is illustrated in the drawings and described below. In the drawings.

DETAILED DESCRIPTION OF THE PRESENTLY PREFERRED EMBODIMENTS

Figure 1:
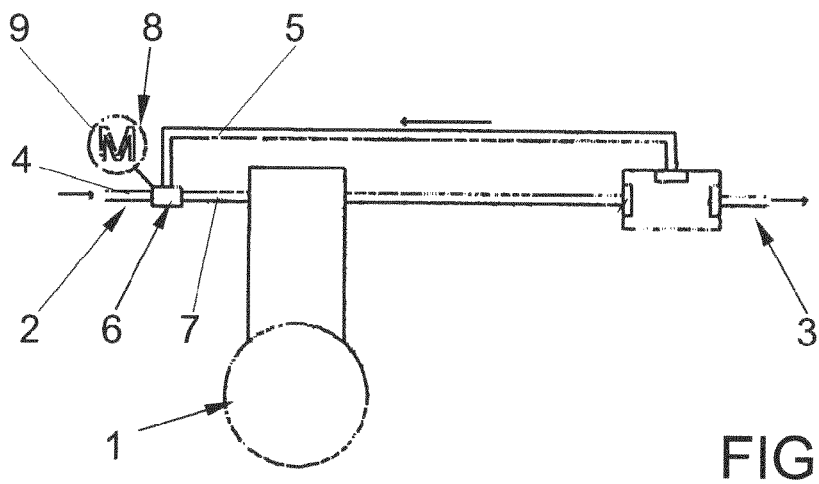
FIG. 1 schematically shows an internal combustion engine of a motor vehicle having a mixing valve according to the invention.

FIG. 1 schematically shows an internal combustion engine 1 having an intake line 2 and having an exhaust line 3. The intake line 2 has an intake duct 4 via which air is drawn in from the environment. An exhaust duct 5 leads from the exhaust line 3 into the intake line 2 via a mixing valve 6. The mixing valve 6 merges the intake duct 4 and the exhaust duct 5 to form a collecting duct 7. The collecting duct 7 leads directly to the internal combustion engine 1. A drive device 8 with an electric actuating motor 9 permits an adjustment of the mixing valve 6.

Figure 2:
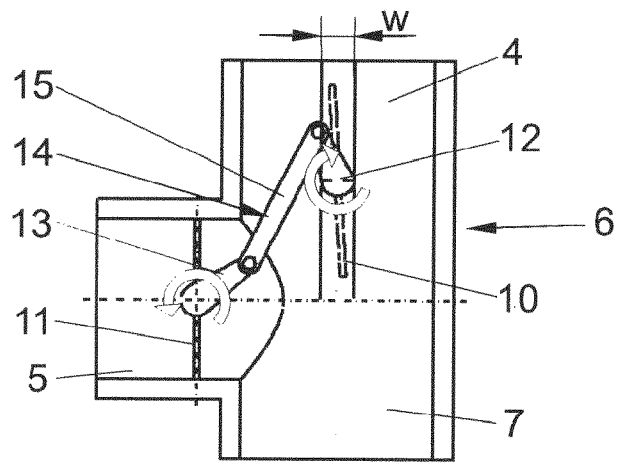
FIG. 2 schematically shows the mixing valve from FIG. 1 in a first position.
Figure 3:
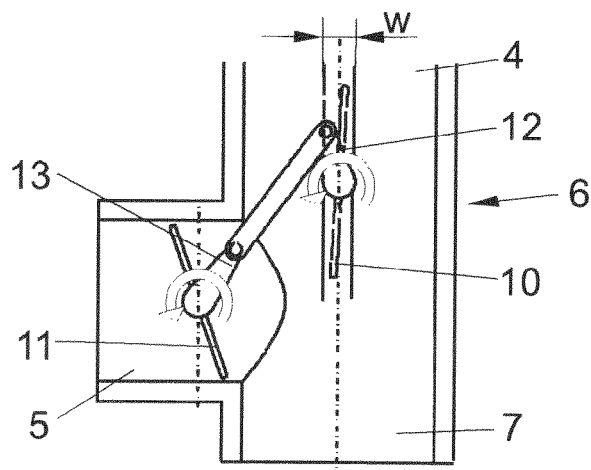
FIGS. 3 and 4 show the mixing valve from FIG. 2 in intermediate positions.

FIG. 2 shows an enlarged sectional illustration of the mixing valve 6, with sub-regions of the intake duct 4, of the exhaust duct 5 and of the collecting duct 7. In the intake duct 4 there is arranged an intake flap 10 which, in the illustrated first position, is almost fully open. In the illustrated first position, an exhaust flap 11 arranged in the exhaust duct 5 is fully closed. Respective control levers 12, 13 are fastened to shafts of the intake flap 10 and of the exhaust flap 11. The control levers 12, 13 are connected by way of a coupling device 14 to a coupling rod 15. In the illustrated first position of the mixing valve 6, the coupling rod 15 and control lever 13 of the exhaust flap 11 form an obtuse angle, whereas the coupling rod 15 and control lever 12 of the intake flap 10 form an acute angle. When the control lever 13 of the exhaust flap 11 is driven counterclockwise, the coupling rod 15 is pivoted and, as far as a dead center illustrated in FIG. 3, is displaced in the direction of control lever 12 of the intake flap 10. In this way, the intake flap 10 is pivoted clockwise.

In FIG. 3, the control lever 13 of the exhaust flap 11 is situated at the described dead center with the coupling rod 15. At the dead center, the coupling rod 15 and control lever 13 of the exhaust flap 11 form a straight line. This characterizes a reversal point of the intake flap 10.

Figure 4:
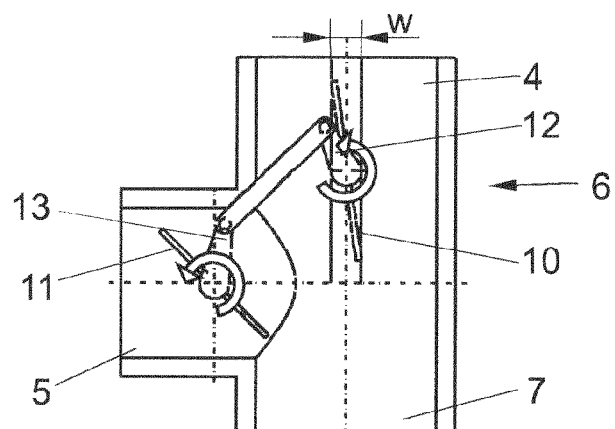

If, proceeding from the position in FIG. 3, the control lever 13 of the exhaust flap 11 is pivoted further counterclockwise, the intake flap 10 is, by way of the coupling rod 15, likewise jointly pivoted counterclockwise. The positions of the intake flap 10 and of the exhaust flap 11 during the movement are illustrated in FIG. 4. A shaft shadow W is illustrated in FIGS. 2 to 4. The shaft shadow W indicates the extent to which the cross section of the intake duct 4 is constricted by a shaft (not illustrated) to which the intake flap 10 is fastened.

Figure 5:
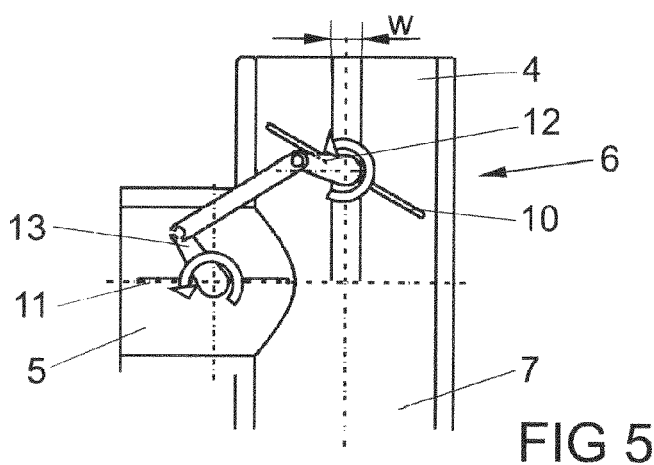
FIG. 5 shows the mixing valve from FIG. 2 in an end position.

FIG. 5 shows an end position of the mixing valve 6, in which the exhaust duct 5 is fully open. The intake duct 4 is partially closed. The position of the intake flap 10 in the end position can be set by way of the ratios of the lengths of the control levers 12, 13.

Figure 6:
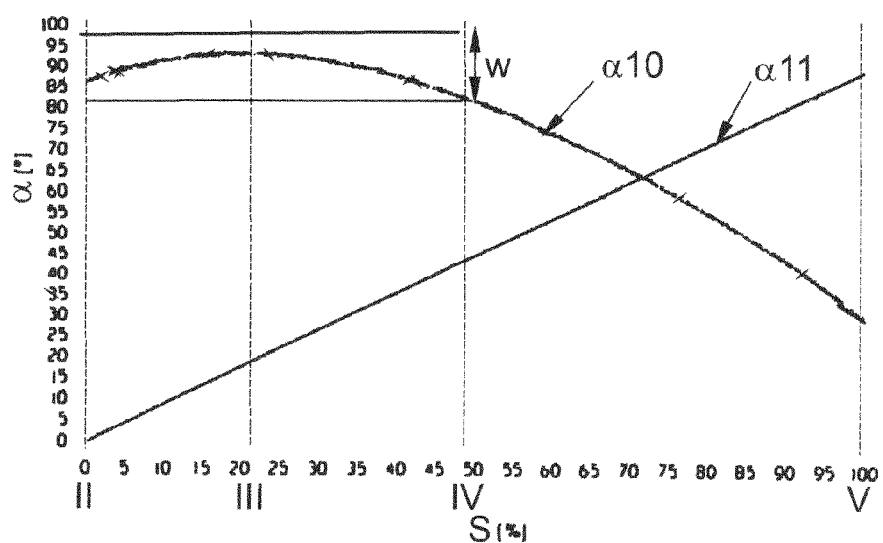
FIG. 6 shows the profile of deflection angles of an intake flap and of an exhaust flap versus an actuation signal.

FIG. 6 shows the profile of the pivot angle $\alpha 10$ of the intake flap 10 and of the pivot angle $\alpha 11$ of the exhaust flap 11 as a function of an actuation signal S of the drive device 8 from FIG. 1. It can be seen here that the pivot angle $\alpha 11$ of the exhaust flap 11 increases linearly with the actuation signal S. In a first range, however, the pivot angle $\alpha 10$ of the intake flap 10 fluctuates within the shaft shadow W. Only when the intake flap 10 emerges from the shaft shadow W does the closing process of the intake duct 4 take place. For illustrative purposes, in FIG. 6, the positions of the exhaust flap 11 and of the intake flap 10 of FIGS. 2 to 5 are denoted by Roman numerals II to V.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A mixing valve (6) of an internal combustion engine (1) of a motor vehicle, comprising:
   an intake duct (4);
   an exhaust duct (5), wherein, in a first position, the exhaust duct (5) is closed and the intake duct (4) is open;
   a common collecting duct (7) into which the intake duct (4) and exhaust duct (5) commonly issue;
   an intake flap (10) affixed to an intake flap shaft and arranged in the intake duct (4) pivotably movable about a longitudinal axis of the intake flap shaft;
   an intake flap control lever (12) fastened to the intake flap shaft;
   an exhaust flap (11) affixed to an exhaust flap shaft and arranged in the exhaust duct (5) pivotably movable about a longitudinal axis of the exhaust flap shaft;
   an exhaust flap control lever (13) fastened to the exhaust flap shaft;
   a drive device (8) driving the intake flap (10) and the exhaust flap (11); and
   a coupling device (14) coupled to the exhaust flap control lever (13) and to the intake flap control lever (12), the coupling device having a coupling rod (15) having a first end directly and hingedly connected to the exhaust flap control lever (13) and a second end directly and hingedly connected to the intake flap control lever (12),
   wherein the coupling rod (15) provides, by the direct and hinged connection between the first end of the coupling rod (15) and the exhaust flap control lever (13) and by the direct and hinged connection between the second end of the coupling rod (15) and the intake flap control lever (12), direct transmission of movements of the intake flap control lever (12) and the exhaust flap control lever (13) to one another, such that, in the first position, in which the exhaust duct (5) is closed and the intake duct (4) is open, the exhaust flap control lever (13) and the coupling rod (15) contact one another so as to form an obtuse angle between the exhaust flap control lever (13) and the coupling rod (15), and the intake flap control lever (12) and the coupling rod (15) contact one another so as to form an acute angle between the intake flap control lever (12) and the coupling rod (15).

2. A mixing valve (6) of an internal combustion engine (1) of a motor vehicle, comprising:
   an intake duct (4);

an exhaust duct (5), wherein, in a first position, the exhaust duct (5) is closed and the intake duct (4) is open;

a common collecting duct (7) into which the intake duct (4) and exhaust duct (5) commonly issue;

an intake flap (10) affixed to an intake flap shaft and arranged in the intake duct (4) pivotably movable about a longitudinal axis of the intake flap shaft;

an intake flap control lever (12) fastened to the intake flap shaft;

an exhaust flap (11) affixed to an exhaust flap shaft and arranged in the exhaust duct (5) pivotably movable about a longitudinal axis of the exhaust flap shaft;

an exhaust flap control lever (13) fastened to the exhaust flap shaft;

a drive device (8) driving the intake flap (10) and the exhaust flap (11); and a coupling device (14) coupled to the exhaust flap control lever (13) and to the intake flap control lever (12), the coupling device having a coupling rod (15) connected to each of the exhaust flap control lever (13) and the intake flap control lever (12), wherein the coupling rod (15) is configured to provide direct transmission of movements of the intake flap control lever (12) and the exhaust flap control lever (13) to one another, and, in the first position, the exhaust flap control lever (13) and the coupling rod (15) contact one another and are arranged at an obtuse angle relative to one another, and the intake flap control lever (12) and the coupling rod (15) contact one another and are arranged at an acute angle relative to one another, and wherein, proceeding from the first position, the intake flap control lever (12) and the exhaust flap control lever (13) and the coupling rod (15) are arranged such that the movements of the exhaust flap (11) and of the intake flap (10) take place in opposite directions and, after a partial movement, take place in a same direction.

3. A mixing valve (6) of an internal combustion engine (1) of a motor vehicle, comprising:

an intake duct (4);

an exhaust duct (5), wherein, in a first position, the exhaust duct (5) is closed and the intake duct (4) is open;

a common collecting duct (7) into which the intake duct (4) and exhaust duet (5) commonly issue;

an intake flap (10) affixed to an intake flap shaft and arranged in the intake duct (4) pivotably movable about a longitudinal axis of the intake flap shaft;

an intake flap control lever (12) fastened to the intake flap shaft;

an exhaust flap (11) affixed to an exhaust flap shaft and arranged in the exhaust duct (5) pivotably movable about a longitudinal axis of the exhaust flap shaft;

an exhaust flap control lever (13) fastened to the exhaust flap shaft;

a drive device (8) driving the intake flap (10) and the exhaust flap (11); and a coupling device (14) coupled to the exhaust flap control lever (13) and to the intake flap control lever (12), the coupling device having a coupling rod (15) connected to each of the exhaust flap control lever (13) and the intake flap control lever (12), wherein the coupling rod (15) is configured to provide direct transmission of movements of the intake flap control lever (12) and the exhaust flap control lever (13) to one another, and, in the first position, the exhaust flap control lever (13) and the coupling rod (15) contact one another and are arranged at an obtuse angle relative to one another, and the intake flap control lever (12) and the coupling rod (15) contact one another and are arranged at an acute angle relative to one another, and wherein, in the first position, the exhaust flap control lever (13) is situated ahead of a dead center at which said exhaust flap control lever (13) forms a straight line with the coupling rod (15).

4. The mixing valve as claimed in claim 1, wherein the intake flap control lever (12) is of a different length than the exhaust flap control lever (13).

5. The mixing valve as claimed in claim 1, wherein the drive device (8) has an actuating motor (9) driving the exhaust flap (11).

6. The mixing valve as claimed in claim 1, wherein the exhaust duct (5) is arranged at right angles to the intake duct (4), in that, in the first position, the exhaust flap (11) is arranged approximately parallel to the intake flap (10), and in that the intake flap control lever (12) and the exhaust flap control lever (13) face toward one another.

* * * * *